United States Patent
Jung et al.

(10) Patent No.: US 9,519,996 B2
(45) Date of Patent: Dec. 13, 2016

(54) VIRTUAL VIEW GENERATING METHOD AND APPARATUS

(71) Applicant: Huawei Technologies Co., Ltd., Shenzhen (CN)

(72) Inventors: Cheolkon Jung, Xi'an (CN); Mingchen Han, Shenzhen (CN); Zengzeng Sun, Xi'an (CN); Licheng Jiao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 14/570,077

(22) Filed: Dec. 15, 2014

(65) Prior Publication Data

US 2015/0170404 A1    Jun. 18, 2015

(30) Foreign Application Priority Data

Dec. 16, 2013    (CN) .......................... 2013 1 0690338

(51) Int. Cl.
| | | |
|---|---|---|
| *G06T 15/00* | (2011.01) | |
| *G06T 15/20* | (2011.01) | |
| *H04N 13/00* | (2006.01) | |
| *G06T 7/00* | (2006.01) | |
| *G06T 19/00* | (2011.01) | |

(52) U.S. Cl.
CPC ............. *G06T 15/20* (2013.01); *G06T 7/0075* (2013.01); *G06T 19/006* (2013.01); *H04N 13/0011* (2013.01)

(58) Field of Classification Search
CPC ... H04N 13/0011; G06T 19/006; G06T 15/20; G06T 7/0075

USPC ......................................... 345/419, 427, 619
See application file for complete search history.

(56) References Cited

U.S. PATENT DOCUMENTS

| | | | | |
|---|---|---|---|---|
| 8,411,931 B2* | 4/2013 | Zhou | .................. | H04N 13/0029 |
| | | | | 375/240.16 |
| 8,669,979 B2* | 3/2014 | Li | ....................... | H04N 13/0022 |
| | | | | 345/421 |

(Continued)

FOREIGN PATENT DOCUMENTS

| | | |
|---|---|---|
| CN | 102835119 A | 12/2012 |
| EP | 2 393 298 | * 12/2011 |
| WO | 2011120228 A1 | 10/2011 |

OTHER PUBLICATIONS

Tam, W.J., "Non-uniform Smoothing of Depth Maps Before Image-Based Rendering," Three-Dimensional Tv, Video and Display III, Proceedings of SPIE, vol. 5599, Oct. 6, 2011, pp. 173-183.

(Continued)

*Primary Examiner* — Phu K Nguyen
(74) *Attorney, Agent, or Firm* — Conley Rose, P.C.

(57) ABSTRACT

A virtual view generating method and apparatus are provided that are used to resolve a technical problem existing in the prior art that there are holes in a virtual view, so as to improve quality of the virtual view. The method includes obtaining an original image and an original depth map of the original image; preprocessing the original depth map based on an adaptive filtering algorithm to obtain a processed depth map; generating a basic virtual view based on the original image and the processed depth map; and performing hierarchical hole filling on the basic virtual view based on a deconvolution algorithm to generate a virtual view.

19 Claims, 2 Drawing Sheets

(56) References Cited

U.S. PATENT DOCUMENTS

| | | | | |
|---|---|---|---|---|
| 8,866,920 | B2* | 10/2014 | Venkataraman | H04N 5/2253 348/218.1 |
| 8,953,874 | B2* | 2/2015 | Wu | G06K 9/00201 382/154 |
| 9,042,636 | B2* | 5/2015 | Turner | H04N 13/026 382/103 |
| 9,053,562 | B1* | 6/2015 | Rabin | G06T 19/00 |
| 9,100,642 | B2* | 8/2015 | Ha | H04N 13/026 |
| 9,111,350 | B1* | 8/2015 | Mukherjee | G06T 7/0075 |
| 2013/0009943 | A1 | 1/2013 | Li et al. | |

OTHER PUBLICATIONS

Foreign Communication From A Counterpart Application, European Application No. 14197537.5, Extended European Search Report dated Apr. 16, 2015, 9 pages.

"ISO/IEC CD 23002-3 Auxiliary Video Data Representation," ISO/IEC JTC 1/SC 29/WG 11/N8038, Apr. 2006, 24 pages.

Park, Y., "Depth-image-based rendering for 3DTV service over T-DMB," Signal Processing: Image Communication, vol. 24, Issue 1-2, Retrieved from URL: http://www.sciencedirect.com/science/article/pii/S0923596508001185 on Mar. 4, 2015, Jan. 2009, 5 pages.

Solh, M., et al., "Hierarchical Hole-Filling for Depth-Based View Synthesis in FTV and 3D Video," IEEE Journal of Selected Topics in Signal Processing, vol. 6, No. 5, Sep. 2012, pp. 495-504.

Criminisi, A., et al., "Region Filling and Object Removal by Exemplar-Based Image Inpainting," IEEE Transactions on Image Processing, vol. 13, No. 9, Sep. 2004, 13 pages.

Zhang, L., et al., "Stereoscopic Image Generation Based on Depth Images for 3D TV," IEEE Transactions on Broadcasting, vol. 51, No. 2, Jun. 2005, pp. 191-199.

Vazquez, C., et al., "Stereoscopic Imaging: filing disoccluded areas in depth image-based rendering," Retrieved from URL: proceedings.spiedigitallibrary.org/proceeding.aspx?articleid=1294775 on Mar. 4, 2015, Proceedings Article, Oct. 17, 2006, 2 pages.

Abstract of Tam, W., et al., "Nonuniform smoothing of depth maps before image-based rendering," Proc. SPIE 5599, Three-Dimensional TV, Video and Display III, Oct. 25, 2004, retrieved from URL: http://proceedings,spiedigitallibrary.org/proceedings.aspx?articleid=852442 on Mar. 14, 2016, 2 pages.

Xiaojun, L, "Hole Filling in 2D Video to 3D Conversion," Southwest Jiaotong University, Master Degree Thesis, May 2013, 22 pages.

English Translation of Xiaojun, L., "Hole Filling in 2D Video to 3D Conversion," Southwest Jiaotong University, Master Degree Thesis, Mar. 16, 2016, 4pages.

Qiuwen, Z., "Research on the Key Technologies of Depth Coding for Free Viewpoint Video," Communication and Information System, Shanghai University, May 2012, 16 pages.

English Translation of Qiuwen, Z., "Research on the Key Technologies of Depth Coding for Free Viewpoint Video," Communication and Information System, Shanghai University, Mar. 16, 2016, 5 pages.

Xu, P., "The Key Techniques for Converting 2D to 3D Video Based on DIBR," Apr. 15, 2012, 2 pages.

English Translation of Xu, P., "The Key Techniques for Converting 2D to 3D Video Based on DIBR," Mar. 16, 2016, 2 pages.

Foreign Communication From a Counterpart Application, Chinese Application No. 201310690338.X, Chinese Search Report dated Dec. 14, 2015, 3 pages.

Foreign Communication From a Counterpart Application, Chinese Application No. 201310690338.X, Chinese Office Action dated Dec. 31, 2015, 6 pages.

* cited by examiner

VIRTUAL VIEW GENERATING METHOD AND APPARATUS

CROSS-REFERENCE TO RELATED APPLICATION

This application claims priority to Chinese Patent Application No. 201310690338.X, filed on Dec. 16, 2013, which is hereby incorporated by reference in its entirety.

TECHNICAL FIELD

The present invention relates to the field of image processing, and in particular, to a virtual view generating method and apparatus.

BACKGROUND

With development of electronic technologies and wide application of the three-dimensional (3D) display technology, conventional human-interactive manual two-dimensional to three-dimensional (2D-to-3D) conversion is far from satisfying market demands. Therefore, an automatic 2D-to-3D technology has tremendous potential value.

In the prior art, an automatic conversion technology includes two core steps: (1) generate a depth map; and (2) generate a left virtual view and a right virtual view. A task of step 1 is to search, in a 2D image, for third dimensional depth information in two-dimensional (2D) image space and store the depth information in a form of a depth map; in step 2, a left view and a right view that are required for displaying a 3D image are generated by using the 2D image and the depth map that is obtained in step 1. However, in a view generating process, corresponding points of some pixel points in a new view cannot be found in an original view; therefore, holes are generated, which reduces quality of a virtual view.

SUMMARY

The present invention provides a virtual view generating method and apparatus, which are used to resolve a technical problem existing in the prior art that there are holes in a virtual view, so as to improve quality of the virtual view.

According to a first aspect, the present invention provides a virtual view generating method, including obtaining an original image and an original depth map of the original image; preprocessing the original depth map based on an adaptive filtering algorithm to obtain a processed depth map; generating a basic virtual view based on the original image and the processed depth map; and performing hierarchical hole filling on the basic virtual view based on a deconvolution algorithm to generate a virtual view.

With reference to the first aspect, in a first possible implementation manner, the preprocessing the original depth map based on an adaptive filtering algorithm to obtain a processed depth map is performing, by separately using a first convolution kernel and a second convolution kernel, adaptive filtering on the original depth map sequentially to obtain the processed depth map.

With reference to the first possible implementation manner, in a second possible implementation manner, the original depth map is preprocessed by using the first convolution kernel according to the following formula:

$$D^{(t+1)}(x,y) = \frac{1}{N^{(t)}(x,y)} \sum_{i=-1}^{1} \sum_{j=-1}^{1} D^{(t)}(x+i, y+i)w^{(t)}(x+i, y+j),$$

where $D^{(t+1)}(x,y) = \max(D^{(t+1)}(x,y), D^{(t)}(x,y))$, $$N^{(t)}(x,y) = \sum_{i=-1}^{1} \sum_{j=-1}^{1} w^{(t)}(x+i, y+j),$$

t indicates the number of iteration times and t=0, 1, 2 ..., $D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, w(x,y) is the first convolution kernel, $$w^{(t)}(x,y) = g(|\nabla D_0^{(t)}(x,y)|) = \frac{1}{1 + \sqrt{|\nabla D_0^{(t)}(x,y)|}},$$

$|\nabla D_0^{(t)}(x,y)| = (G_x^{(t)}(x,y))^2 + (G_y^{(t)}(x,y))^2$, $G_x^{(t)}(x,y)$ is a horizontal gradient that is of the pixel in the depth map and is input at the $t^{th}$ iteration, $G_y^{(t)}(x,y)$ is a vertical gradient that is of the pixel in the depth map and is input at the $t^{th}$ iteration, N(x,y) is a normalization factor, x is a horizontal coordinate of the pixel, y is a vertical coordinate of the pixel, i is a horizontal-axis offset of the pixel, and j is a vertical-axis offset, of the pixel.

With reference to the first possible implementation manner, in a third possible implementation manner, the original depth map is preprocessed by using the second convolution kernel according to the following formula:

$$D^{(t+1)}(x,y) = \frac{1}{N^{(t)}(x,y)} \sum_{i=-1}^{1} \sum_{j=-1}^{1} D^{(t)}(x+i, y+i)w^{(t)}(x+i, y+j),$$

where $D^{(t+1)}(x,y) = \max(D^{(t+1)}(x,y), D^{(t)}(x,y))$, $$N^{(t)}(x,y) = \sum_{i=-1}^{1} \sum_{j=-1}^{1} w^{(t)}(x+i, y+j),$$

t indicates the number of iteration times and t=0, 1, 2 ..., $D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, w(x,y) is the second convolution kernel, $$w^{(t)}(x,y) = \begin{cases} (1 - |\cos(\alpha^{(t)}(x,y))|) \times (1 - g(|\nabla D_0^{(t)}(x,y)|)) & \text{if} |\nabla D_0^{(t)}(x,y)| > h \\ 1 & \text{else} \end{cases},$$

$$\alpha^{(t)}(x,y) = \tan^{-1}\left(\frac{G_y^{(t)}(x,y)}{G_x^{(t)}(x,y)}\right),$$

$|\nabla D_0^{(t)}(x,y)| = (G_x^{(t)}(x,y))^2 + (G_y^{(t)}(x,y))^2$, $G_x^{(t)}(x,y)$ is a horizontal gradient that is of the pixel in the depth map and is input at the $t^{th}$ iteration, $G_y^{(t)}(x,y)$ is a vertical gradient that is of the pixel in the depth map and is input at the $t^{th}$ iteration, and h is a threshold.

With reference to the first aspect and any one of the first possible implementation manners to the third possible implementation manner, in a fourth possible implementation manner, the generating a basic virtual view based on the original image and the processed depth map includes calculating a horizontal pixel-level parallax between a pixel in the virtual view and a pixel in the original image according to the depth value of the pixel in the depth map; and generating the basic virtual view according to the pixel in the original view and the pixel-level parallax.

With reference to the first aspect and any one of the first possible implementation manners to the fourth possible implementation manner, in a fifth possible implementation manner, the performing hierarchical hole filling on the basic virtual view based on a deconvolution algorithm to generate a virtual view includes performing downsampling reduction on the basic virtual view to obtain a reduced image; performing deconvolution expansion on the reduced image to obtain an expanded image; and performing, by using the expanded image, hierarchical hole filling on the reduced image to generate the virtual view.

With reference to the first aspect and any one of the first possible implementation manners to the fourth possible implementation manner, in a sixth possible implementation manner, the performing hierarchical hole filling on the basic virtual view based on a deconvolution algorithm to generate a virtual view includes performing depth adaptive reduction on the basic virtual view to obtain a reduced image; performing deconvolution expansion on the reduced image to obtain an expanded image; and performing, by using the expanded image, hierarchical hole filling on the reduced image to generate the virtual view.

With reference to the sixth possible implementation manner, in a seventh possible implementation manner, depth adaptive reduction is performed on the basic virtual view according to the following formula:

$$R_{k+1}[x, y] = \begin{cases} \sum_{i=-2}^{2}\sum_{j=-2}^{2} w[i+2, j+2]R_k[2x+i, 2y+j], & \text{if } nz(R_k[2x, 2y]) = 25 \\ \dfrac{\sum_{i=-2}^{2}\sum_{j=-2}^{2} R_k[2x+i, 2y+j]f_k[2x+i, 2y+j]}{\text{non\_zero}(2x+i, 2y+j)}, & \text{if } nz(R_k[2x, 2y]) < 25 \\ \quad\quad (2x+i, 2y+j) \end{cases}$$

where $$\text{non\_zero}(x, y) = \begin{cases} 0, & \text{if } R_k[x, y] = 0 \\ 1, & \text{else} \end{cases},$$

$f_k$ is a depth adaptive weighted value image corresponding to $R_k$, $R_{k+1}$ is an image after reduction, $R_k$ is an image before reduction, and $nz(R_k[2x,2y])$ is the number of nonzero values, in a 5×5 window at a point [2x, 2y], of $R_k$.

With reference to the sixth possible implementation manner or the seventh possible implementation manner, in an eighth possible implementation manner, the performing deconvolution expansion on the reduced image to obtain an expanded image includes performing upsampling on the reduced image to obtain an upsampling result; and performing deconvolution calculation on the upsampling result to obtain the expanded image.

According to a second aspect, the present invention provides a virtual view generating apparatus, including an image acquiring unit configured to obtain an original image and an original depth map of the original image; a preprocessing unit configured to preprocess the original depth map based on an adaptive filtering algorithm to obtain a processed depth map; a basic virtual view generating unit configured to generate a basic virtual view based on the original image and the processed depth map; and a hole filling unit configured to perform hierarchical hole filling on the basic virtual view based on a deconvolution algorithm to generate a virtual view.

With reference to the second aspect, in a first possible implementation manner, the preprocessing unit is configured to perform, by separately using a first convolution kernel and a second convolution kernel, adaptive filtering on the original depth map sequentially to obtain the processed depth map.

With reference to the second aspect or the first possible implementation manner, in a second possible implementation manner, the basic virtual view generating unit includes a horizontal pixel-level parallax calculating unit configured to calculate a horizontal pixel-level parallax between a pixel in the virtual view and a pixel in the original image according to a depth value of a pixel in the depth map; and a basic virtual view generating subunit configured to generate the basic virtual view according to the pixel in the original view and the pixel-level parallax.

With reference to the second aspect, the first possible implementation manner, or the second possible implementation manner, in a third possible implementation manner, the hole filling unit includes a reducing unit configured to perform downsampling reduction on the basic virtual view to obtain a reduced image; an expanding unit configured to perform deconvolution expansion on the reduced image to obtain an expanded image; and a hierarchical hole filling unit configured to perform, by using the expanded image, hierarchical hole filling on the reduced image to generate the virtual view.

With reference to the second aspect and any one of the first possible implementation manner to the third possible implementation manner, in a fourth possible implementation manner, the hole filling unit includes a reducing unit configured to perform depth adaptive reduction on the basic virtual view to obtain a reduced image; an expanding unit configured to perform deconvolution expansion on the reduced image to obtain an expanded image; and a hierarchical hole filling unit configured to perform, by using the expanded image, hierarchical hole filling on the reduced image to generate the virtual view.

With reference to the third possible implementation manner or the fourth possible implementation manner, in a fifth possible implementation manner, the expanding unit includes an upsampling unit configured to perform upsampling on the reduced image to obtain an upsampling result;

and a deconvolution unit configured to perform deconvolution calculation on the upsampling result to obtain the expanded image.

Beneficial effects of the present invention are as follows.

After an original image and an original depth map of the original image are obtained, first, the original depth map is preprocessed based on an adaptive filtering algorithm to obtain a processed depth map, so that a vertical edge with a relatively large variation in depth is smoothed and a horizontal edge is reserved as much as possible, thereby effectively reducing the number of holes in a basic view generated afterward and phenomena of image twisting and distortion; then, a basic virtual view is generated based on the original image and the processed depth map; and hierarchical hole filling is performed on the basic virtual view based on a deconvolution algorithm to generate a virtual view, so that remaining holes are effectively eliminated, the finally generated virtual view has relatively clear edges and a relatively consistent texture result, and quality of the generated virtual view is improved.

DESCRIPTION OF EMBODIMENTS

Embodiments of the application provide a virtual view generating method and apparatus, which are used to resolve a technical problem existing in the prior art that there are holes in a virtual view, so as to improve quality of the virtual view.

The technical solutions in the embodiments of the application are for resolving the foregoing problem that there are holes in the virtual view, and an overall idea is as follows.

After an original image and an original depth map of the original image are obtained, first, the original depth map is preprocessed based on an adaptive filtering algorithm to obtain a processed depth map, so that a vertical edge with a relatively large variation in depth is smoothed and a horizontal edge is reserved as much as possible, thereby effectively reducing the number of holes in a basic view generated afterward and phenomena of image twisting and distortion; then, a basic virtual view is generated based on the original image and the processed depth map; and hierarchical hole filling is performed on the basic virtual view based on a deconvolution algorithm to generate a virtual view, so that remaining holes are effectively eliminated, the finally generated virtual view has relatively clear edges and a relatively consistent texture result, and quality of the generated virtual view is improved.

The technical solutions of the present invention are described in detail with reference to accompanying drawings and specific embodiments as follows. It should be understood that the embodiments of the present invention and specific features in the embodiments are intended for describing the technical solutions of the present invention in detail, but not for limiting the technical solutions of the present invention. The embodiments of the present invention and technical features in the embodiments may be mutually combined in a case in which they do not conflict with each other.

In a first aspect, the present invention provides a virtual view generating method, which is applied to an electronic device, where the electronic device may be a smartphone, a tablet computer, a laptop computer, a smart television, a multimedia player, or the like. All these electronic devices include a display that supports 3D display, where the display may be an ordinary liquid crystal display, or may be a touchscreen, or a flexible display, which is not limited in the application.

Figure 1:
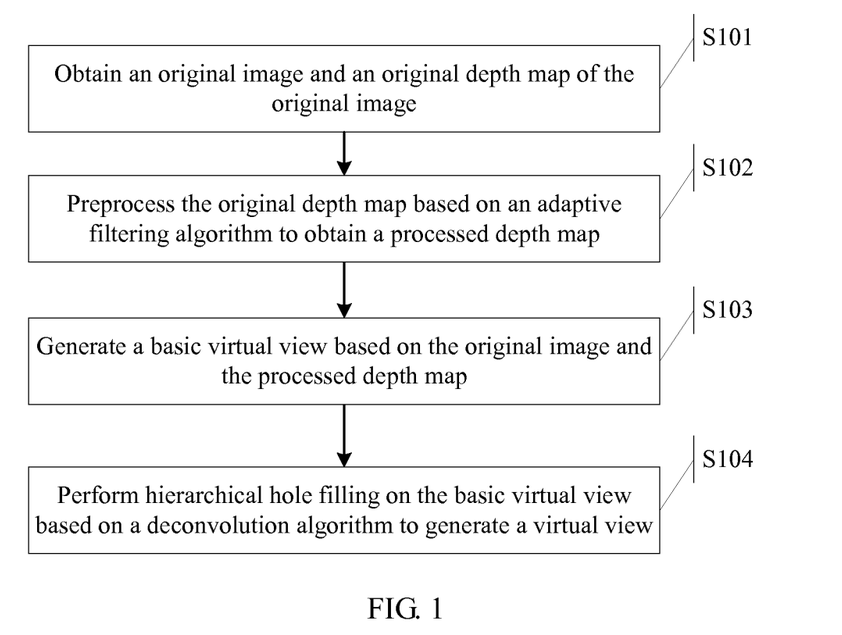
FIG. 1 is a flowchart of a virtual view generating method according to an embodiment of the present invention.

Referring to FIG. 1, the foregoing method includes the following steps.

S101: Obtain an original image and an original depth map of the original image.

S102: Preprocess the original depth map based on an adaptive filtering algorithm to obtain a processed depth map.

S103: Generate a basic virtual view based on the original image and the processed depth map.

S104: Perform hierarchical hole filling on the basic virtual view based on a deconvolution algorithm to generate a virtual view.

In this embodiment, the original depth map obtained in S101 is generated by processing the original image, that is, a 2D image, by using various depth map generating algorithms in the prior art. For specific depth map generating algorithms, a person skilled in the art may make a choice according to an actual requirement, which is not limited in the application.

After the original image and the original depth map are obtained, S102 of preprocessing the original depth map based on an adaptive filtering algorithm to obtain a processed depth map is performed, that is, the original depth map is preprocessed, a vertical edge with a relatively large variation in depth is smoothed, and a horizontal edge is reserved as much as possible, thereby effectively reducing the number of holes in a basic view generated afterward and phenomena of image twisting and distortion.

Optionally, to protect borders, merely smooth areas are filtered, and S102 may be as follows. Perform, by separately using a first convolution kernel and a second convolution kernel, adaptive filtering on the original depth map sequentially to obtain the processed depth map.

The foregoing two times of filtering are performed based on the following filtering framework, where the filtering framework is shown in formula (1):

$$D^{(t+1)}(x, y) = \frac{1}{N^{(t)}(x, y)} \sum_{i=-1}^{1} \sum_{j=-1}^{1} D^{(t)}(x+i, y+i)w^{(t)}(x+i, y+j), \quad (1)$$

where $D^{(t+1)}(x,y) = \max(D^{(t+1)}(x,y), D^{(t)}(x,y))$, $$N^{(t)}(x, y) = \sum_{i=-1}^{1} \sum_{j=-1}^{1} w^{(t)}(x+i, y+j),$$

$D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, $w(x,y)$ is a convolution kernel, $N(x,y)$ is a normalization factor, t indicates the number of iteration times and t=0, 1, 2 . . . , x is a horizontal coordinate of the pixel, y is a vertical coordinate of the pixel, i is a horizontal-axis offset of the pixel, and j is a vertical-axis offset of the pixel.

In another embodiment, $D^{(t+1)}(x,y)$ may further be shown in formula (2):

$$D^{(t+1)}(x, y) = \begin{cases} D^{(t)}(x, y), & \text{if } (D^{(t)}(x, y) > T) \\ D^{(t+1)}(x, y), & \text{else} \end{cases} \quad (2)$$

where T is a depth division value of a foreground part and a background part, and in each round of iteration, a value of T may change self-adaptively, which is not limited in the application.

Certainly, the adaptive filtering algorithm is not merely limited to the foregoing two types, and there may also be other algorithms, as long as it can be ensured that a foreground part with a relatively large depth value is free of filtering and a background part with a relatively small depth value is filtered, perception of original depth information is reserved separately, a size and the number of holes in the basic view generated afterward can be effectively reduced, and undesirable phenomena such as twisting and distortion can be avoided as much as possible, which is not limited in the application.

Optionally, in this embodiment, the first convolution kernel is shown in formula (3):

$$w^{(t)}(x, y) = g(|\nabla D_0^{(t)}(x, y)|) = \frac{1}{1 + \sqrt{|\nabla D_0^{(t)}(x, y)|}}, \quad (3)$$

where $|\nabla D_0^{(t)}(x,y)| = (G_x^{(t)}(x,y))^2 + (G_y^{(t)}(x,y))^2$, $G_x^{(t)}(x,y)$ is a horizontal gradient that is of the pixel in the depth map and is input at the $t^{th}$ iteration, and $G_y^{(t)}(x,y)$ is a vertical gradient that is of the pixel in the depth map and is input at the $t^{th}$ iteration.

Optionally, in this embodiment, the second convolution kernel is shown in formula (4):

$$w^{(t)}(x, y) = \quad (4)$$
$$\begin{cases} (1 - |\cos(\alpha^{(t)}(x, y))|) \times (1 - g|\nabla D_0^{(t)}(x, y)|) & \text{if} |\nabla D_0^{(t)}(x, y)| > h \\ 1 & \text{else} \end{cases},$$

where $$\alpha^{(t)}(x, y) = \tan^{-1}\left(\frac{G_y^{(t)}(x, y)}{G_x^{(t)}(x, y)}\right),$$

$|\nabla D_0^{(t)}(x,y)| = (G_x^{(t)}(x,y))^2 + (G_y^{(t)}(x,y))^2$, $G_x^{(t)}(x,y)$ is the horizontal gradient that is of the pixel in the depth map and is input at the $t^{th}$ iteration, $G_y^{(t)}(x,y)$ is the vertical gradient that is of the pixel in the depth map and is input at the $t^{th}$ iteration, and h is a threshold.

In an actual application, a value range of h is a natural number from 0 to 2552+2552 and may be determined by a person skilled in the art according to an actual situation, which is not limited in the application.

Therefore, the calculated first convolution kernel and the calculated second convolution kernel are separately substituted into the filtering framework shown in formula (1); two times of filtering are performed on the original depth map; in this way, a processed depth map after smoothing processing can be output.

It should be noted that, in a process of the foregoing two times of filtering, a larger hole leads to a larger-size window to be used, which is not limited in the application. In this embodiment, a window with a size of 3×3 may be used.

Subsequently, S103 of generating a basic virtual view based on the original image and the processed depth map is performed.

First, a horizontal pixel-level parallax between a pixel in the virtual view and a pixel in an original view is calculated according to a depth value of a pixel in the depth map.

The foregoing horizontal pixel-level parallax $p_{pix}$ is determined by using formula (5):

$$p_{pix} \approx -x_B \frac{N_{pix}}{2D}\left(\frac{m}{255}(k_{near} + k_{far}) - k_{far}\right), \quad (5)$$

where $x_B$ indicates a spacing distance between eyes, $N_{pix}$ indicates a screen width measured by pixels, D is an observation distance, that is, a distance between a person and a display screen, $k_{near}$ is a range of a depth value in front of an image plane, $k_{far}$ is a range of a depth value behind the image plane, m is a pixel value in the preprocessed depth map, and a value of m is an integer ranging from 0 to 255.

In this actual application, $x_B$ may be 6 centimeters (cm); $k_{near}$ may be a natural number ranging from 0 to 2; and $k_{far}$ may be 8. For indoor observation, it is usually assumed that D is 300 cm.

Further, the basic virtual view is generated according to the pixel in the original view and the pixel-level parallax.

In a specific implementation process, the pixel in the virtual view is obtained by mapping the pixel in the original view according to the foregoing obtained pixel-level parallax $p_{pix}$ and formula (6); and a basic virtual view with unfilled holes is further obtained. Formula (6) is shown as follows:

$$x_{R_i} = x_{V_i} + sp_{pix} \quad (6),$$

where $x_{R_i}$ indicates a horizontal coordinate of a pixel $R_i$ in the virtual view, $x_{V_i}$ indicates a horizontal coordinate of a pixel $V_i$ in the original view, i=1, 2, 3, . . . , S is a binary code, if a left virtual view is generated, s=1, and if a right virtual view is generated, s=−1.

To eliminate the holes in the basic virtual view and improve quality of the generated virtual view, further, S104 of performing hierarchical hole filling on the basic virtual view based on a deconvolution algorithm to generate a virtual view is performed.

Figure 2:
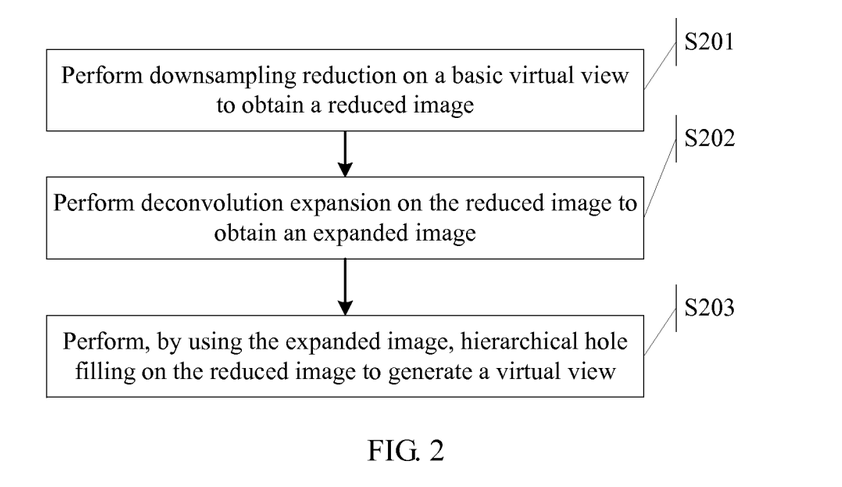
FIG. 2 is a flowchart of a method for performing hierarchical hole filling on a basic virtual view based on a deconvolution algorithm according to an embodiment of the present invention.

In a specific implementation process, as shown in FIG. 2, S104 may include:

S201: Perform downsampling reduction on the basic virtual view to obtain a reduced image.

S202: Perform deconvolution expansion on the reduced image to obtain an expanded image.

S203: Perform, by using the expanded image, hierarchical hole filling on the reduced image to generate the virtual view.

In this embodiment, downsampling reduction is performed on the basic virtual view in an iterative manner in S201. For example, downsampling is performed on a basic virtual view $R_0$ for the first time to obtain a reduced image $R_1$; and in a second step, downsampling is performed on $R_1$ for a second time to obtain a reduced image $R_2$ and so on, until $R_0$ is reduced to $R_n$ that has no obvious holes. It should be noted that the number of times of downsampling reduction is determined by a size of the biggest hole in the basic virtual view. In this actual application, three times of downsampling reduction are usually used. Certainly, because the size of the biggest hole is determined by a screen width (which is actually an image width), a person skilled in the art may make a choice according to the screen width in a case in which both a processing speed and a processing effect are considered, which is not limited in the application.

Correspondingly, S202 is an inverse process of S201. Therefore, deconvolution expansion is also performed on the basic virtual view in an iterative manner; and the number of iteration times is consistent with that in S201.

The following gives a detailed description of the foregoing procedures.

First, downsampling reduction is performed on the basic virtual view to obtain the reduced image. For example, a downsampling reduction operation is iteratively performed on the basic virtual view $R_0$, a series of downsampling reduced images $R_1, R_2, \ldots R_n$ s generated sequentially. $R_1$ is half of $R_0$ in spatial resolution; therefore, the number of holes in $R_1$ decreases accordingly; likewise, $R_2$ is a reduced version of $R_1$ and so on, until $R_0$ is reduced to $R_n$ that has no obvious holes.

In this embodiment, the downsampling factor that is used is 2; in this case, downsampling reduction in S201 may be performed according to the following formula (7):

$$R_{k+1}[x, y] = \begin{cases} \sum_{i=-2}^{2} \sum_{j=-2}^{2} w[i+2, j+2] R_k[2x+i, & \text{if } nz(R_k[2x, 2y]) = 25 \\ 2y+j], & \\ \frac{\sum_{i=-2}^{2} \sum_{j=-2}^{2} R_k[2x+i, 2y+j]}{nz(R_k[2x, 2y])}, & \text{if } 0 < nz(R_k[2x, 2y]) < 25 \\ 0, & \text{if } nz(R_k[2x, 2y]) = 0 \end{cases} \quad (7)$$

where $R_{k+1}$ is an image after reduction, $R^k$ is an image before reduction, k is the number of times of downsampling reduction, k is a natural number, W is a Gaussian kernel with a size of 5*5, $nz(R_k[2x,2y])$ is the number of nonzero values, in a 5*5 window at a point [2x, 2y], of $R_k$, x is a horizontal coordinate of a pixel, and y is a vertical coordinate of the pixel.

In a specific implementation process, a sampling factor may also be another value, which is not limited in the application.

In another embodiment, another algorithm may also be used to perform reduction in the foregoing reduction process, that is, S201; in this case, before S202, the method may further include performing depth adaptive reduction on the basic virtual view to obtain a reduced image. In other words, depth adaptive reduction is performed on the basic virtual view; and a series of reduced images $R_1, R_2, \ldots R_n$ is generated sequentially in an iterative manner.

In this embodiment, depth adaptive reduction is performed on the basic virtual view according to the following formula (8).

$$R_{k+1}[x, y] = \quad (8)$$

$$\begin{cases} \sum_{i=-2}^{2} \sum_{j=-2}^{2} w[i+2, j+2] R_k[2x+i, & \text{if } nz(R_k[2x, 2y]) = 25 \\ 2y+j], \sum_{i=-2}^{2} \sum_{j=-2}^{2} R_k[2x+i, 2y+ & \\ j] f_k[2x+i, 2y+j] & \\ \frac{\text{non\_zero}(2x+i, 2y+j)}{\sum_{i=-2}^{2} \sum_{j=-2}^{2} f_k[2x+i, 2y+j] \text{non\_zero}}, & \text{if } nz(R_k[2x, 2y]) < 25 \\ (2x+i, 2y+j) & \end{cases}$$

where $$\text{non\_zero}(x, y) = \begin{cases} 0, & \text{if } R_k[x, y] = 0 \\ 1, & \text{else} \end{cases},$$

$f_k$ is a depth adaptive weighted value image corresponding to $R_k$, $R_{k+1}$ is an image after reduction, $R_k$ is an image before reduction, and $nz(R_k [2x, 2y])$ is the number of nonzero values, in a 5×5 window at a point [2x, 2y], of $R_k$.

Further, the foregoing depth adaptive weighted value image $f_k$ is obtained by using the following formula (9).

$$f[x, y] = \frac{\gamma}{\sigma}\left(1 - \exp\left(-\left|\frac{(\beta_{max} + \delta)}{p_{pix}[x, y]}\right|\right)\right), \quad (9)$$

where $$\gamma = \frac{3}{2}\beta_{median} + \beta_{min}, \sigma = \frac{4}{3}\beta_{median} + \beta_{min}, \delta = \frac{1}{2}\beta_{median} + \beta_{min},$$

$\beta_{min}$, $\beta_{max}$, and $\beta_{median}$ refer to a minimum average parallax value, a maximum average parallax value, and an average parallax value, respectively. The average parallax value is an arithmetic average of the maximum average parallax value and the minimum average parallax value; $p_{pix}$ is determined by using formula (5).

Further, the foregoing obtained reduced image is expanded, that is, S202 of performing deconvolution expansion on the reduced image to obtain an expanded image is performed.

In this embodiment, during first-time expansion, k=n−1 is set; the final image $R_n$ with no hole obtained in S201 is used as an input E of this step; and deconvolution expansion is performed on E to obtain an expanded image $E_{n-1}$ that has the same size as $R_{n-1}$.

Then, S203 is performed, that is, the performing, by using the expanded image, hierarchical hole filling on the reduced image to generate the virtual view is performed.

A corresponding pixel in $E_{n-1}$ is used to replace a hole in $R_{n-1}$, so as to obtain a hole-replaced result $F_{n-1}$.

Subsequently, the foregoing S201 to S203 are performed iteratively to generate the virtual view.

For example, during second-time expansion, $F_{n-1}$ is used as an input E; in this case, k=n−2, an expanded image $E_{n-2}$ that has the same size as an $R_{n-2}$ is obtained. A corresponding pixel in $E_{n-2}$ is used to replace a hole in $R_{n-2}$, so as to obtain a hole-replaced result $F_{n-2}$ and so on, until last-time expansion is performed, that is, $F_1$ is used as an input E; in this case, k=1, an expanded image $E_0$ that has the same size as $R_0$ is obtained. A corresponding pixel in $E_0$ is used to replace a hole in $R_0$, so as to obtain a hole-replaced result $F_0$. In this way, the finally output virtual view, that is, $F_0$, is obtained.

In the foregoing expansion process, a deconvolution expansion result with clear edges and texture can be obtained by using a deconvolution-based expansion method. A mathematical description of an entire process is shown in formula (10):

$$E_k = E \uparrow^2 \otimes^{-1} w \qquad (10),$$

where $E_k$ is an output image obtained by performing deconvolution expansion calculation, $\uparrow^2$ indicates an upsampling operator with a sampling factor being 2, $\otimes^{-1}$ indicates a deconvolution operator, W is consistent with the convolution kernel in the foregoing reduction process and is a Gaussian kernel with a size of 5*5.

In this embodiment, the foregoing deconvolution calculation is implemented by minimizing the following target energy function shown in formula (11):

$$E(E_k) = \qquad (11)$$
$$\|w \otimes E_k - I\|_2^2 + k_1 (\|(\partial_x E_k - \partial_x I) \circ M\|_2^2 + \|(\partial_y E_k - \partial_y I) \circ M\|_2^2) +$$
$$k_2 \left( \sum_{i=1}^n \frac{(\partial_x E_k)_i^2}{1 + (\partial_x I)_i^2} + \sum_{i=1}^n \frac{(\partial_y E_k)_i^2}{1 + (\partial_y I)_i^2} \right),$$

where I represents an interpolation image that is obtained by performing upsampling with a factor 2 on an input image E, is a gradient $(\|(\partial_x E_k - \partial_x I) \cdot M\|_2^2 + \|(\partial_y E_k - \partial_y I) \cdot M\|_2^2)$ is a gradient consistency constraint item, $$\left( \sum_{i=1}^n \frac{(\partial_x E_k)_i^2}{1 + (\partial_x I)_i^2} + \sum_{i=1}^n \frac{(\partial_y E_k)_i^2}{1 + (\partial_y I)_i^2} \right)$$

is an anisotropic constraint item, $\partial_x$ indicates a horizontal image gradient operator, $\partial_y$ indicates a vertical image gradient operator, n indicates the total number of all elements in an image matrix, i is used to indicate the $i^{th}$ element of a corresponding image matrix, $k_1$ is a weighted value used to adjust the gradient consistency constraint item, $k_2$ is a weighted value used to adjust the anisotropic constraint item, · indicates a point multiplication operation of the image matrix, and M is a binary matrix that has the same size as the interpolation image I. If the sum of a square of a horizontal gradient of a pixel in the interpolation image I and a square of a vertical gradient of the pixel in the interpolation image I is not greater than a preset threshold, that is, an inequation is satisfied: $(\partial_x I)_i^2 + (\partial_y I)_i^2 < T$, where T is a threshold, $m_i = 1$, $m_i$ is a corresponding element in M, and otherwise, $m_i = 0$.

In an actual application, if it is hoped that an image is sharper, T may be set to be slightly larger; if it is hoped that an image is smoother so that edge noise is not generated, T may be set to be relatively small. A person skilled in the art may set T according to an actual requirement, which is not limited in the application. Preferably, T=42 is set.

Further, during the foregoing hierarchical hole filling, each expanded image $E_k$ with no hole is used to fill a hole in each reduced same-resolution image $R_k$ with a hole, so as to obtain a hole-filled image $F_k$. For a point of a pixel [x, y], a process of hole filling is shown in formula (12):

$$F_k = \begin{cases} E_k[x, y], & \text{if } R_k[x, y] = 0 \\ R_k[x, y], & \text{else} \end{cases} \qquad (12)$$

The foregoing steps are performed until the foregoing $F_0$ is generated, so that a virtual view of an original image is generated.

In another embodiment, in an actual application, a virtual view is classified into a left eye virtual view and a right eye virtual view, and both can be obtained according to the foregoing method. After an original image and an original depth map of the original image are obtained, first, the original depth map is preprocessed based on an adaptive filtering algorithm to obtain a processed depth map, so that a vertical edge with a relatively large variation in depth is smoothed and a horizontal edge is reserved as much as possible, thereby effectively reducing the number of holes in a basic view generated afterward and phenomena of image twisting and distortion; then, a basic virtual view is generated based on the original image and the processed depth map; and hierarchical hole filling is performed on the basic virtual view based on a deconvolution algorithm to generate a virtual view, so that remaining holes are effectively eliminated, the finally generated virtual view has relatively clear edges and a relatively consistent texture result, and quality of the generated virtual view is improved.

Figure 3:
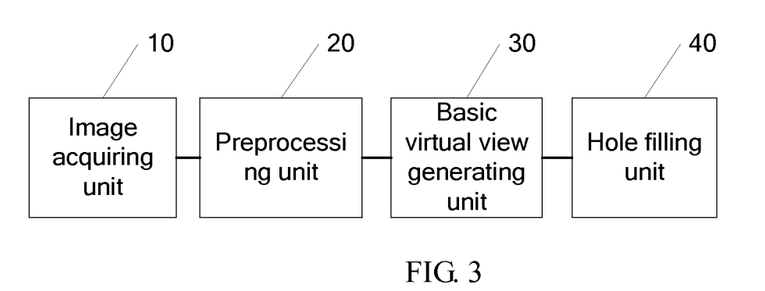
FIG. 3 is a functional block diagram of a virtual view generating apparatus according to an embodiment of the present invention.

Based on a same invention concept, the present invention further provides a virtual view generating apparatus. As shown in FIG. 3, the apparatus includes an image acquiring unit 10 configured to obtain an original image and an original depth map of the original image; a preprocessing unit 20 configured to preprocess the original depth map based on an adaptive filtering algorithm to obtain a processed depth map; a basic virtual view generating unit 30 configured to generate a basic virtual view based on the original image and the processed depth map; and a hole filling unit 40 configured to perform hierarchical hole filling on the basic virtual view based on a deconvolution algorithm to generate a virtual view.

Further, the preprocessing unit 20 is configured to perform, by separately using a first convolution kernel and a second convolution kernel, adaptive filtering on the original depth map sequentially to obtain the processed depth map.

Further, the basic virtual view generating unit 30 includes a horizontal pixel-level parallax calculating unit configured to calculate a horizontal pixel-level parallax between a pixel in the virtual view and a pixel in an original image according to a depth value of a pixel in the depth map; and a basic virtual view generating subunit configured to generate the basic virtual view according to the pixel in the original view and the pixel-level parallax.

Further, the hole filling unit 40 includes a reducing unit configured to perform downsampling reduction on the basic virtual view to obtain a reduced image; an expanding unit configured to perform deconvolution expansion on the reduced image to obtain an expanded image; and a hierarchical hole filling unit configured to perform, by using the expanded image, hierarchical hole filling on the reduced image to generate the virtual view.

In another embodiment, the hole filling unit 40 includes a reducing unit configured to perform depth adaptive reduction on the basic virtual view to obtain a reduced image; an expanding unit configured to perform deconvolution expansion on the reduced image to obtain an expanded image; and a hierarchical hole filling unit configured to perform, by using the expanded image, hierarchical hole filling on the reduced image to generate the virtual view.

Further, the expanding unit includes an upsampling unit configured to perform upsampling on the reduced image to obtain an upsampling result; and a deconvolution unit configured to perform deconvolution calculation on the upsampling result to obtain the expanded image.

Various types of variations and specific examples in the virtual view generating method in the foregoing embodiment are also applicable to the apparatus in this embodiment. With the detailed description of foregoing virtual view generating method, a person skilled in the art may clearly understand the implementation manner of the apparatus in this embodiment. Therefore, for brevity of the specification, details are not repeatedly described herein.

The technical solutions provided by the foregoing embodiment of the application have at least the following technical effects or advantages.

After an original image and an original depth map of the original image are obtained, first, the original depth map is preprocessed based on an adaptive filtering algorithm to obtain a processed depth map, so that a vertical edge with a relatively large variation in depth is smoothed and a horizontal edge is reserved as much as possible, thereby effectively reducing the number of holes in a basic view generated afterward and phenomena of image twisting and distortion; then, a basic virtual view is generated based on the original image and the processed depth map; and hierarchical hole filling is performed on the basic virtual view based on a deconvolution algorithm to generate a virtual view, so that remaining holes are effectively eliminated, the finally generated virtual view has relatively clear edges and a relatively consistent texture result, and quality of the generated virtual view is improved.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps is performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

What is claimed is:

1. A virtual view generating method, comprising:
obtaining an original image and an original depth map of the original image;
preprocessing the original depth map based on an adaptive filtering algorithm to obtain a processed depth map by sequentially performing, separately using a first convolution kernel and a second convolution kernel, adaptive filtering on the original depth map;
generating a basic virtual view based on the original image and the processed depth map; and
performing hierarchical hole filling on the basic virtual view based on a deconvolution algorithm to generate a virtual view,
wherein the original depth map is preprocessed by using the first convolution kernel according a formula:

$$D^{(t+1)}(x, y) = \frac{1}{N^{(t)}(x, y)} \sum_{i=-1}^{1} \sum_{j=-1}^{1} D^{(t)}(x+i, y+i) w^{(t)}(x+i, y+j),$$

and
wherein $D^{(t+1)}(x,y) = \max(D^{(t+1)}(x,y), D^{(t)}(x,y))$, $$N^{(t)}(x, y) = \sum_{i=-1}^{1} \sum_{j=-1}^{1} w^{(t)}(x+i, y+j),$$

t indicates the number of iteration time and t=0, 1, 2 ..., $D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, $w(x,y)$ is the first convolution kernel, $$w^{(t)}(x, y) = g(|\nabla D_0^{(t)}(x, y)|) = \frac{1}{1 + \sqrt{|\nabla D_0^{(t)}(x, y)|}},$$

$|\nabla D_0^{(t)}(x,y)| = (G_x^{(t)}(x,y))^2 + (G_y^{(t)}(x,y))^2$, $G_x^t(x,y)$ is horizontal gradient that is of the pixel in the depth map and is input at the $t^{th}$ iteration, $G_y^{(t)}(x,y)$ is a vertical gradient that is of the pixel in the depth map and is input at the $t^{th}$ iteration, $N(x,y)$ is a normalization factor, x is a horizontal coordinate of the pixel, y is a vertical coordinate of the pixel, i is a horizontal-axis offset of the pixel, and j is vertical-axis offset of the pixel.

2. The method according to claim 1, wherein the original depth map is preprocessed by using the second convolution kernel according to a formula:

$$D^{(t+1)}(x, y) = \frac{1}{N^{(t)}(x, y)} \sum_{i=-1}^{1} \sum_{j=-1}^{1} D^{(t)}(x+i, y+i) w^{(t)}(x+i, y+j),$$

and wherein $D^{(t+1)}(x,y) = \max(D^{(t+1)}(x,y), D^{(t)}(x,y))$, $$N^{(t)}(x, y) = \sum_{i=-1}^{1} \sum_{j=-1}^{1} w^{(t)}(x+i, y+j),$$

t indicates the number of iteration times and t=0, 1, 2 . . . , $D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, w(x,y) is the second convolution kernel, $$w^{(t)}(x, y) = \begin{cases} (1 - |\cos(\alpha^{(t)}(x, y))|) \times (1 - g(|\nabla D_0^{(t)}(x, y)|)) & \text{if } |\nabla D_0^{(t)}(x, y)| > h \\ 1 & \text{else} \end{cases},$$

$$\alpha^{(t)}(x, y) = \tan^{-1}\left(\frac{G_y^{(t)}(x, y)}{G_x^{(t)}(x, y)}\right),$$

$$|\nabla D_0^{(t)}(x, y)| = (G_x^{(t)}(x, y))^2 + (G_y^{(t)}(x, y))^2,$$

$G_x^{(t)}(x,y)$ is a horizontal gradient that is of the pixel in the depth map and is input at the $t^{th}$ iteration, $G_y^{(t)}(x,y)$ is a vertical gradient that is of the pixel in the depth map and is input at the $t^{th}$ iteration, and h is a threshold.

3. The method according to claim 1, wherein generating the basic virtual view based on the original image and the processed depth map comprises:

calculating a horizontal pixel-level parallax between a pixel in the virtual view and a pixel in the original image according to a depth value of the pixel in the processed depth map; and generating the basic virtual view according to the pixel in the original image and the horizontal pixel-level parallax.

4. The method according to claim 1, wherein performing the hierarchical hole filling on the basic virtual view based on the deconvolution algorithm to generate the virtual view comprises:

performing downsampling reduction on the basic virtual view to obtain a reduced image;

performing deconvolution expansion on the reduced image to obtain an expanded image; and performing, by using the expanded image, hierarchical hole filling on the reduced image to generate the virtual view.

5. The method according to claim 1, wherein performing the hierarchical hole filling on the basic virtual view based on the deconvolution algorithm to generate the virtual view comprises:

performing depth adaptive reduction on the basic virtual view to obtain a reduced image;

performing deconvolution expansion on the reduced image to obtain an expanded image; and performing, by using the expanded image, hierarchical hole filling on the reduced image to generate the virtual view.

6. The method according to claim 5, wherein the depth adaptive reduction is performed on the basic virtual view according to a formula:

$$R_{k+1}[x, y] = \begin{cases} \sum_{i=-2}^{2} \sum_{j=-2}^{2} w[i+2, j+2] R_k[2x+i, 2y+j], & \text{if } nz(R_k[2x, 2y]) = 25 \\ \dfrac{\sum_{i=-2}^{2} \sum_{j=-2}^{2} R_k[2x+i, 2y+j] }{\dfrac{f_k[2x+i, 2y+j] \text{non\_zero}(2x+i, 2y+j)}{\sum_{i=-2}^{2} \sum_{j=-2}^{2} f_k[2x+i, 2y+j]}} , & \text{if } nz(R_k[2x, 2y]) < 25 \\ \text{non\_zero}(2x+i, 2y+j) \end{cases},$$

wherein $$\text{non\_zero}(x, y) = \begin{cases} 0, & \text{if } R_k[x, y] = 0 \\ 1, & \text{else} \end{cases},$$

$f^k$ is a depth adaptive weighted value image corresponding to $R_k$, $R_{k+1}$ is an image after reduction, $R_k$ is an image before reduction, x is a horizontal coordinate of the pixel, y is a vertical coordinate of the pixel, i is a horizontal-axis offset of the pixel, and j is a vertical-axis offset of the pixel, and $nz(R_k[2x,2y])$ is the number of nonzero values, in a 5×5 window at a point [2x, 2y], of $R_k$.

7. The method according to claim 5, wherein performing the deconvolution expansion on the reduced image to obtain the expanded image comprises:

performing upsampling on the reduced image to obtain an upsampling result; and performing deconvolution calculation on the upsampling result to obtain the expanded image.

8. A virtual view generating apparatus, comprising:

a memory; and a processor coupled to the memory and configured to:

obtain an original image and an original depth map of the original image;

preprocess the original depth map based on an adaptive filtering algorithm to obtain a processed depth map by sequentially performing, separately using a first convolution kernel and a second convolution kernel, adaptive filtering on the original depth map;

generate a basic virtual view based on the original image and the processed depth map; and perform hierarchical hole filling on the basic virtual view based on a deconvolution algorithm to generate a virtual view by:

performing depth adaptive reduction on the basic virtual view to obtain a reduced image according to the formula:

$$R_{k+1}[x, y] =$$

$$\begin{cases} \sum_{i=-2}^{2}\sum_{j=-2}^{2} w[i+2, j+2]R_k[2x+i, 2y+j], & \text{if } nz(R_k[2x, 2y]) = 25 \\ \dfrac{\sum_{i=-2}^{2}\sum_{j=-2}^{2} R_k[2x+i, 2y+j] \cdot f_k[2x+i, 2y+j]\text{non\_zero}(2x+i, 2y+j)}{\sum_{i=-2}^{2}\sum_{j=-2}^{2} f_k[2x+i, 2y+j] \cdot \text{non\_zero}(2x+i, 2y+j)}, & \text{if } nz(R_k[2x, 2y]) < 25 \end{cases}$$

wherein $$\text{non\_zero}(x, y) = \begin{cases} 0, & \text{if } R_k[x, y] = 0 \\ 1, & \text{else} \end{cases},$$

$f_k$ is a depth adaptive weighted value image corresponding to $R_k$, $R_{k+1}$ is an image after reduction, $R_k$ is an image before reduction, x is a horizontal coordinate of the pixel, y is a vertical coordinate of the pixel, i is a horizontal-axis offset of the pixel, and j is a vertical-axis offset of the pixel, and $nz(R_k[2x,2y])$ is the number of nonzero values, in a 5×5 window at a point [2x, 2y], of $R_k$;

performing deconvolution expansion on the reduced image to obtain an expanded image; and
performing, by using the expanded image, hierarchical hole filling on the reduced image to generate the virtual view.

9. The apparatus according to claim 8, wherein the processor is further configured to:
calculate a horizontal pixel-level parallax between a pixel in the virtual view and a pixel in the original image according to a depth value of a pixel in the processed depth map; and
generate the basic virtual view according to the pixel in the original image and the horizontal pixel-level parallax.

10. The apparatus according to claim 8, wherein the processor is further configured to:
perform downsampling reduction on the basic virtual view to obtain a reduced image;
perform deconvolution expansion on the reduced image to obtain an expanded image; and
perform, by using the expanded image, hierarchical hole filling on the reduced image to generate the virtual view.

11. The apparatus according to claim 10, wherein the processor is further configured to:
perform upsampling on the reduced image to obtain an upsampling result; and
perform deconvolution calculation on the upsampling result to obtain the expanded image.

12. The apparatus according to claim 8, wherein the processor is further configured to:
perform depth adaptive reduction on the basic virtual view to obtain a reduced image;
perform deconvolution expansion on the reduced image to obtain an expanded image; and
perform, by using the expanded image, hierarchical hole filling on the reduced image to generate the virtual view.

13. A virtual view generating method, comprising:
obtaining an original image and an original depth map of the original image;
preprocessing the original depth map based on an adaptive filtering algorithm to obtain a processed depth map by sequentially performing, separately using a first convolution kernel and a second convolution kernel, adaptive filtering on the original depth map;
generating a basic virtual view based on the original image and the processed depth map; and
performing hierarchical hole filling on the basic virtual view based on a deconvolution algorithm to generate a virtual view,
wherein the original depth map is preprocessed by using the second convolution kernel according to a formula:

$$D^{(t+1)}(x, y) = \frac{1}{N^{(t)}(x, y)} \sum_{i=-1}^{1} \sum_{j=-1}^{1} D^{(t)}(x+i, y+j) w^{(t)}(x+i, y+j),$$

and
wherein $D^{(t+1)}(x,y) = \max(D^{(t+1)}(X,y), D^{(t)}(x,y))$, $$N^{(t)}(x, y) = \sum_{i=-1}^{1} \sum_{j=-1}^{1} w^{(t)}(x+i, y+j),$$

t indicates the number of iteration times and t=0, 1, 2 . . . , $D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, w(x,y) is the second convolution kernel, $$w^{(t)}(x, y) = \begin{cases} (1 - |\cos(\alpha^{(t)}(x, y))|) \times (1 - g(|\nabla D_0^{(t)}(x, y)|)) & \text{if } |\nabla D_0^{(t)}(x, y)| > h \\ 1 & \text{else} \end{cases},$$

$$\alpha^{(t)}(x, y) = \tan^{-1}\left(\frac{G_y^{(t)}(x, y)}{G_x^{(t)}(x, y)}\right),$$

$$|\nabla D_0^{(t)}(x, y)| = (G_x^{(t)}(x, y))^2 + (G_y^{(t)}(x, y))^2,$$

is a horizontal gradient that is of the pixel in the depth map and is input at the $t^{th}$ iteration, $G_y^{(t)}(x,y)$ is a vertical gradient that is of the pixel in the depth map and is input at the $t^{th}$ iteration, and h is a threshold.

14. The method according to claim 13, wherein the original depth map is preprocessed by using the first convolution kernel according a formula:

$$D^{(t+1)}(x, y) = \frac{1}{N^{(t)}(x, y)} \sum_{i=-1}^{1} \sum_{j=-1}^{1} D^{(t)}(x+i, y+j) w^{(t)}(x+i, y+j),$$

and
wherein $D^{(t+1)}(x,y) = \max(D^{(t+1)}(x,y), D^{(t)}(x,y))$, $$N^{(t)}(x, y) = \sum_{i=-1}^{1} \sum_{j=-1}^{1} w^{(t)}(x+i, y+j),$$

t indicates the number of iteration times and t=0, 1, 2 ..., $D^{(t)}(x,y)$ is a depth value that is of a pixel in a depth map and is input at the $t^{th}$ iteration, $D^{(t+1)}(x,y)$ is a depth value that is of the pixel in the depth map and is obtained after the $t^{th}$ iteration, w(x,y) is the first convolution kernel, $$w^{(t)}(x, y) = g(|\nabla D_0^{(t)}(x, y)|) = \frac{1}{1 + \sqrt{|\nabla D_0^{(t)}(x, y)|}},$$

$|\nabla D_0^{(t)}| = G_x^{(t)}(x,y))^2 + (x,y))^2 + (G_y^{(t)}(x,y))^2$, $G_x^{(t)}(x,y)$ is a horizontal gradient that is of the pixel in the depth map and is input at the $t^{th}$ iteration, $G_y^{(t)}(x,y)$ is a vertical gradient that is of the pixel in the depth map and is input at the $t^{th}$ iteration, N(x,y) is a normalization factor, x is a horizontal coordinate of the pixel, y is a vertical coordinate of the pixel, i is a horizontal-axis offset of the pixel, and j is a vertical-axis offset of the pixel.

15. The method according to claim 13, wherein generating the basic virtual view based on the original image and the processed depth map comprises:
  calculating a horizontal pixel-level parallax between a pixel in the virtual view and a pixel in the original image according to a depth value of the pixel in the processed depth map; and
  generating the basic virtual view according to the pixel in the original image and the horizontal pixel-level parallax.

16. The method according to claim 13, wherein performing the hierarchical hole filling on the basic virtual view based on the deconvolution algorithm to generate the virtual view comprises:
  performing downsampling reduction on the basic virtual view to obtain a reduced image;
  performing deconvolution expansion on the reduced image to obtain an expanded image; and
  performing, by using the expanded image, hierarchical hole filling on the reduced image to generate the virtual view.

17. The method according to claim 13, wherein performing the hierarchical hole filling on the basic virtual view based on the deconvolution algorithm to generate the virtual view comprises:
  performing depth adaptive reduction on the basic virtual view to obtain a reduced image;
  performing deconvolution expansion on the reduced image to obtain an expanded image; and
  performing, by using the expanded image, hierarchical hole filling on the reduced image to generate the virtual view.

18. The method according to claim 17, wherein the depth adaptive reduction is performed on the basic virtual view according to a formula:

$$R_{k+1}[x, y] = \begin{cases} \sum_{i=-2}^{2}\sum_{j=-2}^{2} w[1+2, j+2]R_k[2x+i, 2y+j], & \text{if } nz(R_k[2x, 2y]) = 25 \\ \dfrac{\sum_{i=-2}^{2}\sum_{j=-2}^{2} R_k[2x+i, 2y+j]f_k[2x+i, 2y+j]\text{non\_zero}(2x+i, 2y+j)}{\sum_{i=-2}^{2}\sum_{j=-2}^{2} f_k[2x+i, 2y+j]} & \text{if } nz(R_k[2x, 2y]) < 25, \\ \text{non\_zero}(2x+i, 2y+j) \end{cases}$$

and wherein $$\text{non\_zero}(x, y) = \begin{cases} 0, & \text{if } R_k[x, y] = 0 \\ 1, & \text{else,} \end{cases}$$

$f_k$ is a depth adaptive weighted value image corresponding to $R_k$, $R_{k+1}$ is an image after reduction, $R_k$ is an image before reduction, x is a horizontal coordinate of the pixel, y is a vertical coordinate of the pixel, i is a horizontal-axis offset of the pixel, and j is a vertical-axis offset of the pixel, and $nz(R_k[2x\ 2y])$ is the number of nonzero values, in a 5×5 window at a point [2x, 2y], of $R_k$.

19. The method according to claim 17, wherein performing the deconvolution expansion on the reduced image to obtain the expanded image comprises:
  performing upsampling on the reduced image to obtain an upsampling result; and
  performing deconvolution calculation on the upsampling result to obtain the expanded image.

* * * * *